(12) United States Patent
Bartug et al.

(10) Patent No.: US 8,995,039 B2
(45) Date of Patent: Mar. 31, 2015

(54) SWITCHABLE AUTOMOTIVE GLAZING

(75) Inventors: Bruce A. Bartug, Lower Burrell, PA (US); Peter T. Dishart, Wexford, PA (US); Steven M. Parsons, Jeanette, PA (US)

(73) Assignee: Pittsburgh Glass Works, LLC, Pittsburgh, PA (US)

( * ) Notice: Subject to any disclaimer, the term of this patent is extended or adjusted under 35 U.S.C. 154(b) by 0 days.

(21) Appl. No.: 13/465,567

(22) Filed: May 7, 2012

(65) Prior Publication Data
US 2012/0307337 A1 Dec. 6, 2012

Related U.S. Application Data

(60) Provisional application No. 61/483,237, filed on May 6, 2011.

(51) Int. Cl.
G02F 1/03 (2006.01)
G02F 1/15 (2006.01)
G03G 13/00 (2006.01)
B32B 17/10 (2006.01)

(52) U.S. Cl.
CPC ..... *B32B 17/10532* (2013.01); *B32B 17/10036* (2013.01); *B32B 17/10229* (2013.01); *B32B 17/10348* (2013.01); *B32B 17/10761* (2013.01); *B32B 17/1077* (2013.01); *B32B 17/10788* (2013.01)
USPC .............. 359/245; 359/247; 359/265; 430/31

(58) Field of Classification Search
CPC ............... G02F 1/03; G02F 1/15; G02F 3/00; G02F 1/135; G02F 1/133; G02F 1/1343; G03G 13/00; G03G 17/04; G02B 26/00; G02B 26/08
USPC ......... 359/245, 315, 247, 251–252, 254, 108, 359/237–238, 278–279, 290–292, 298, 359/300–302, 296, 259; 430/31–32; 349/49, 105, 107, 33, 38
See application file for complete search history.

(56) References Cited

U.S. PATENT DOCUMENTS

| | | | |
|---|---|---|---|
| 4,927,246 A * | 5/1990 | Ito et al. ..................... 359/275 |
| 6,055,088 A | 4/2000 | Fix et al. |
| 6,770,838 B1 * | 8/2004 | Clement et al. .......... 219/121.61 |
| 2004/0234778 A1 | 11/2004 | Fukatani et al. |
| 2005/0227061 A1 | 10/2005 | Slovak et al. |
| 2009/0153756 A1 * | 6/2009 | Roberts et al. ................ 349/35 |
| 2009/0176101 A1 | 7/2009 | Greenall et al. |
| 2010/0165436 A1 * | 7/2010 | Voss et al. .................... 359/238 |
| 2012/0021230 A1 * | 1/2012 | Fukatani et al. ............. 428/426 |

FOREIGN PATENT DOCUMENTS

DE 102009001629 9/2010
WO 2009061329 5/2009

* cited by examiner

*Primary Examiner* — Dawayne A Pinkney
(74) *Attorney, Agent, or Firm* — Cohen & Grigsby, PC

(57) ABSTRACT

A window glazing (10) suitable for use in automotive applications wherein a switchable film (18) is protected from UV exposure and over-temperature exposure by a coating (14) that reflects IR and UV light in combination with an interlayer (16) that absorbs UV light.

25 Claims, 3 Drawing Sheets

US 8,995,039 B2

SWITCHABLE AUTOMOTIVE GLAZING

BACKGROUND OF THE INVENTION

1. Field of the Invention

The presently disclosed invention is directed to the use of switchable films such as electrochromic materials in automotive applications and, more particularly, the serviceability of SPD and PDLC films in automotive window glazing.

2. Discussion of the Prior Art

There are a number of technologies for changing and controlling the color or transmittance of a glazing panel. Electrochromics is one of the technologies that are sometimes used in automotive applications. Switchable films based on other technologies may also be used. Electrochromics concerns a reversible reaction (chemical or physical) that is induced by the application of an electrical current or electrical potential across an emulsion or film. In certain electrochromic devices, a suspended particle device ("SPD") emulsion or a polymer dispersed liquid crystal ("PDLC") film is confined between two transparent substrate plates. In the case of SPD films, the substrate plates can be made of polyethylene terephthalate ("PET") that are coated with transparent, electrically conductive coatings. When an electrical voltage is applied across the film such as, for example, by applying an ac voltage to the electrically conductive coating on the PET, a change in the color or light transmittance of the emulsion occurs.

Such suspended particle device ("SPD") film or polymer dispersed liquid crystal ("PDLC") film is sometimes referred to as "smart glass" technology. As used in windows in automotive vehicles and similar applications, it is incorporated in "switchable glazing" that allows for the control of light transmittance by controlling an electrical voltage that is applied across the film.

A problem in the prior art has been that such switchable glazings have not had adequate "serviceability." That is, prior art switchable glazings have tended to degrade over time due to exposure to ultraviolet ("UV") light, high temperatures, and chemical reactions with substances in the ambient environment or substances used in the glazing construction. Automotive applications expose switchable glazings to all of those conditions. Over time, such degradation compromises the capacity of switchable glazings to switch between a relatively translucent or opaque state and a relatively transparent state.

Another problem with the use of electrochromic films in switchable glazing has been optical distortion that results from the inclusion of the electrochromic film, such as SPD switchable film, in the glazing. For example, a typical thickness of SPD switchable film is on the order of approximately 0.38 mm. Exposure of the edges of the SPD switchable film to ambient conditions can result in degradation of the SPD switchable film due to, for example, chemical attack. To protect the edges of the SPD switchable film, the SPD switchable film is sometimes centered in the laminate with a boarder of glass and interlayers that extend beyond the perimeter of the SPD switchable film. When the assembly of layers is laminated in an autoclave, the layer assembly in the margin surrounding the perimeter of the SPD switchable film is thinner than the area that includes the SPD switchable film by as much as the thickness of the SPD film. This difference in thickness resulted in curvature of the glass in the areas adjacent to the perimeter of the SPD film that has caused an unacceptable degree of optical distortion. In addition, where the glass and interlayer near the perimeter of the SPD switchable film did not successfully bond, included voids in the region adjacent to the perimeter of the SPD switchable film could sometimes result, or, if the glazing is thereafter exposed to sufficiently high temperatures, resilience of the plies could flex the plies to an unstressed condition and cause the interlayer to draw in so as to create a scant in the glazing.

Switchable films also have presented other disadvantages and difficulties that tend to limit and compromise their use in automotive applications. Accordingly, there was a need in the prior art for a switchable glazing construction that was serviceable and effective for automotive applications.

SUMMARY OF THE DISCLOSED INVENTION

To overcome the foregoing disadvantages, the presently disclosed glazing protects the SPD switchable film from UV and short wave visible light as well as from heat that is caused by absorbed IR light and, in some cases, visible light. Preferably, the glazing includes glass layers that are bonded together with at least one interlayer of material that has relatively high UV absorption that absorbs light in the UV spectrum (less than 380 nm) and even absorbs some light in the visible spectrum above 380 nm. The interlayer with enhanced UV absorption helps protect the switchable film, such as SPD film, from UV light. Preferably, the enhanced UV absorption interlayer absorbs light at wavelengths below 400 nanometers ("nm"). An interlayer with enhanced absorption of UV light at wavelengths below 410 nm is more preferred. Thermoplastic polyurethane ("TPU") and EVA are examples of such preferred interlayer materials that also can be designed to require relatively low temperature during the autoclaving process when the glazing laminate is created. Preferably, autoclaving temperatures for the designed interlayer materials such as TPU and EVA are less than 100° C. and, more preferably, less than 90° C. By comparison, a standard automotive interlayer such as PVB generally requires a lamination temperature at or above 120° C.

In addition to the enhanced UV absorption interlayer, the glazing also includes an IR reflective coating that limits temperature exposure in the intended environment by reflecting IR light that illuminates the glazing. More preferably, the IR reflective coating also reflects light in the UV spectrum and somewhat above the UV spectrum in the range of about 400 to 410 nm. Preferably, the light reflection of the IR reflective coating limits the temperature of the glazing in the anticipated environment for automotive glazing to less than 80° C.

Preferably, a border frame is added in the portion of the glazing that is laterally outside the perimeter of the SPD switchable film.

Also preferably, edges of the electrochromic film are sealed with a layer of substantially impermeable material such as a 1 mil. thickness of Kapton® tape to protect the electrochromic film from degrading due to chemical reaction with one or more of the interlayers as well as with moisture and other substances that can sometimes permeate the interlayers from the environment.

BRIEF DESCRIPTION OF THE DRAWINGS

Presently preferred embodiments of the invention are described herein by way of example in conjunction with the following figures, wherein.

DESCRIPTION OF A PRESENTLY PREFERRED EMBODIMENT

Embodiments of the presently disclosed invention are directed to a window glazing that is suitable, for example, in vehicles or buildings and other architectural structures. The glazing includes a switchable film such as, for example, a suspended particle device ("SPD") film, a polymer dispersed liquid crystal ("PDLC") film, or other film that selectively controls the transmittance of light through the glazing. The glazing includes an IR-reflective coating, such as a metal or metal-based coating, on one or more surfaces of one or more glass panes to reflect infrared ("IR") light. The glazing also includes at least one UV absorptive interlayer. The glazing may further include an impermeable edging material for the electrochromic film to protect against penetration of contamination into the film. In some cases, the IR-reflective coating is further designed to reflect light in the UV spectrum and in part of the visible spectrum to further enhance UV protection of the electrochromic layer and to further limit temperature increases in response to light exposure of the glazing.

Figure 1:
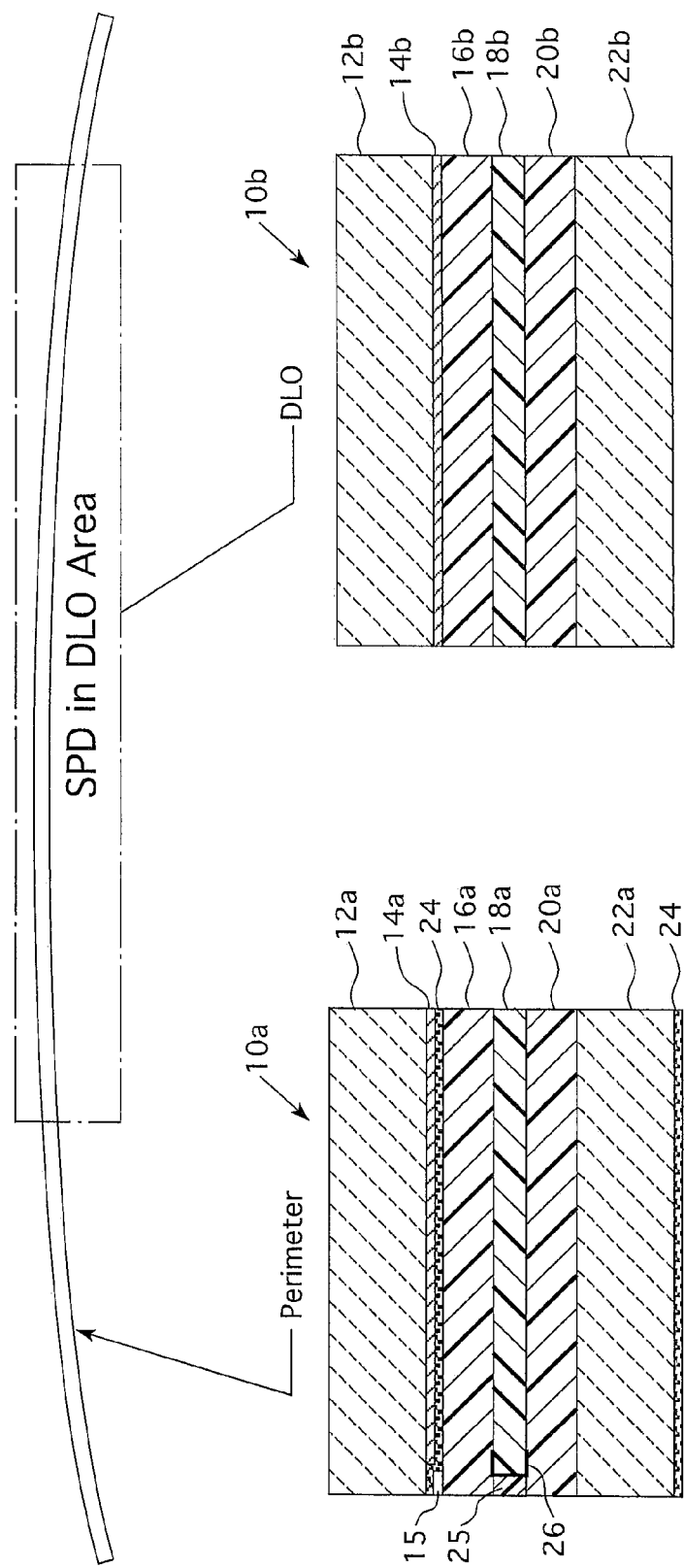
FIG. 1 illustrates a cross section of a window glazing according to various embodiments of the present invention.
Figure 4:
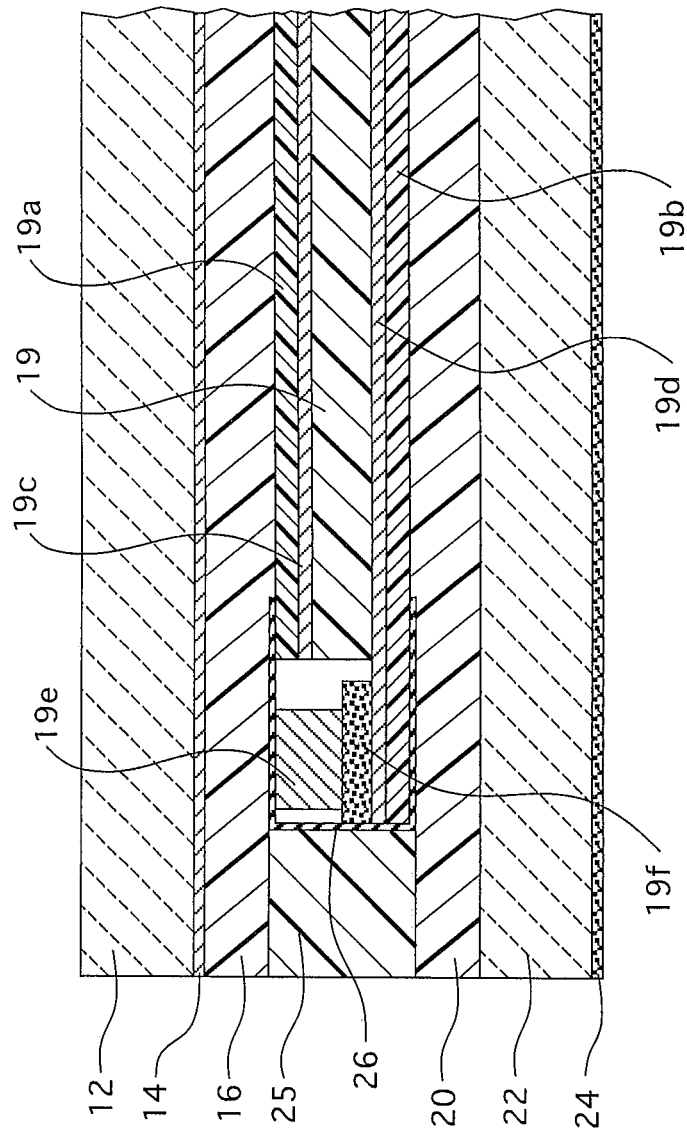
FIG. 4 illustrates another cross section of a window glazing according to the presently disclosed invention.

FIGS. 1 and 4 illustrate a cross section of a window glazing 10 according to one embodiment of the present invention. FIG. 1 illustrates two sections of the window glazing 10 in cross section. A first section 10a of FIG. 1 is located near the perimeter of the glazing 10 and a second section 10b of FIG. 1 is located in a daylight opening ("DLO") portion of the glazing 10. FIG. 4 illustrates a cross-section of the window glazing 10 shown in FIG. 1 and including the region of glazing 10 near the perimeter of the electrochromic film.

As shown in FIGS. 1 and 4, glazing 10 includes a first layer of glass 12 that is the outside layer of glass for glazing 10. Layer of glass 12 has first and second major faces that are oppositely disposed and that define an edge surface therebetween. The first layer of glass 12 is a clear or ultraclear glass of a type that is suitable for use in automotive applications. Examples include PPG Clear glass, Solarphire® glass or PPG Starphire® glass. Clear glass is preferred so that when glazing 10 is illuminated with sunlight, less energy from IR light will be absorbed in glass layer 12 and, as will be understood from the following description; more energy will be reflected back out of the outside layer of glass and away from glazing 10. Ultraclear glass is more preferred because it absorbs less energy from IR light than clear glass and because it's higher transmittance allows more light to be reflected. As will be understood from the following description of an IR-reflective coating, the improvement afforded by clear glass and ultraclear glass is multiplied because the light reflected out of the outside layer of glass travels through the first layer of glass twice—once as it passes through the first layer of glass to an IR reflective coating, and then again as it passes from the IR reflective coating back thought the first layer of glass.

Glazing 10 further includes IR reflective coating 14 that can be a metal or metal-based coating of the type that reflects IR wavelength light while transmitting visible light. Coating 14 can be sputtered or otherwise applied to a major face of glass layer 12. If required, paint may be applied to the major face of the glass layer either before or after the coating application. Preferred IR reflective coatings include double-layer silver coatings. More preferred IR reflective coatings include triple-layer silver coatings. It is most preferred that the IR reflective coating be a triple-layer silver coating that also reflects light in the ultraviolet ("UV") spectrum. Such double-layer silver coatings (Product Code SP05), triple-layer silver coatings (Product Code EP01), and triple-layer silver coatings with enhanced IR and UV reflection (Product Code EP02) are commercially available from PGW. The IR reflective coatings reflect light in the IR spectrum (and also in the UV spectrum and a portion of the visible spectrum in the case of triple-layer silver coating with UV reflection) to limit the temperature of glazing 10 when it is exposed to sunlight. In the case of triple-layer silver coatings (Product Code EP01), the reflective coating limits temperature by reflection of light in the IR spectrum. In the case of triple-layer silver coating with UV reflection (Product Code EP02), in addition to limiting temperature by reflecting light in the IR spectrum, the reflective coating also reflects UV light so that it further protects the electrochromic film from breakdown due to exposure to UV light and, in addition, further limits temperature increase due to thermal energy from absorbed UV light. In one embodiment, the coating 14 is a PPG Sungate® EP02 coating. For that coating in combination with two pieces of clear glass, the transmittance with Ill. A-2 is 58.23% and reflectance is 24.65%. For solar UV illumination as measured by the ISO 9050 (280-380T) standard, transmittance is 0.01% and reflectance is 28.43%. For solar IR illumination measured by the ASTM 891 (800-2500T) standard, transmittance is 0.96% and reflectance is 91.46% for total solar illumination, according to SAE T(R) sol (E892: 300-2500), transmittance is 25.63% and reflectance is 58.82%. In various embodiments, a section 15 of coating 14 is deleted at the edge of the perimeter of the glazing 10 to protect coating 14 against environmental exposure leading to corrosion of the edges of the coating. Typical dimensions of such deleted portions of coating 14 are less than about 10 millimeters ("mm") inward from the edge of glass layer 12. Alternatively, without limiting the present invention, as known to those skilled in the art, as IR reflective layer can be included in the glazing by incorporating an IR reflective material such as product code XIR® from Southwall Technologies.

Glazing 10 further includes a first interlayer 16 having relatively high UV absorption. Interlayer 16 has first and second major faces that are oppositely disposed from each other and that define an outer edge between the first and second oppositely disposed major faces. The first major face of interlayer 16 faces the surface of the IR coating 14. As used in this application, "facing" another face or surface means oriented toward the direction of that other surface although not necessarily touching such other face or surface. Thus, if a major face of interlayer 16 is "facing" the surface of coating 14, the major face of interlayer 16 is oriented in the direction of coating 14, but there could be other layers of material between interlayer 16 and coating 14. In some embodiments, the major face of interlayer 16 could be touching coating 14 while in other embodiments it is not. "Opposing" as used herein means that the surfaces are facing and touching each other and that there are no other layers between the surfaces. For example, if a major face of interlayer 16 is "opposing" the surface of coating 14, the major face of interlayer 16 is touching the surface of coating 14.

Suitable materials for interlayer 16 may include high UV absorption thermoplastic polyurethane ("TPU"), ethylene vinyl acetate ("EVA"), or polyvinyl butyral ("PVB"). The UV absorption interlayer may be without enhanced ultraviolet light absorption, but an interlayer with enhanced UV absorption such as is available from commercial resin suppliers is preferred. In that preferred material, UV absorbers are added to the bulk material such that transmittance of the enhanced UV absorption interlayer is less than about 1% in the light spectrum below 380 nm using the SAE (300-400) standard. Preferably, transmittance of the enhanced UV absorption interlayer is less than about 1% in the light spectrum below 400 nm using the SAE (300-400) standard. Most preferably, transmittance of the enhanced UV absorption interlayer is less than about 1% in the light spectrum below 410 nm using the SAE (300-400) standard. It has been found that such enhanced UV absorption retards degradation of electrochromic film such as SPD film caused by exposure of the electrochromic film to UV and visible light over time.

A primary purpose of the interlayer is to bond the glass panel having the IR-reflective coating with the rest of glazing 10 during an autoclave process. It has been found that to provide appropriate lamination of the glazing while maintaining autoclave temperatures that can be tolerated by switchable film, such as SPD film, the melt index of the interlayer is significant. The melt index is a measure of viscosity at a specified temperature. As used in connection with the presently disclosed invention, the melt index is a predictor of the flow of the interlayer at the lamination temperature. However, the melt index and the intended lamination temperature both vary with the composition of the interlayer, such as the thermoplastic polyurethane material.

To protect the integrity of SPD film from exposure to heat degradation during the autoclave process, it is preferred that the lamination temperature of the interlayer be less than 110° C. It is more preferred that the lamination temperature of the interlayer, such as thermoplastic polyurethane, be less than 100° C. It is most preferred that the lamination temperature of the interlayer, such as thermoplastic polyurethane, be less than 90° C. For thermoplastic materials of this type, if the melt index is too low poor lamination quality will result. However, if the melt index is too high, the thermoplastic material will flow out of the lamination stack—also resulting in poor lamination quality. For example, in the case of a glazing according to the presently disclosed invention using TPU interlayers, it has been found that the TPU interlayer should meet a melt index ("MI") specification in the range of 10 to 130 using the ASTM D-1238 standard. More preferably, the TPU melt index should be in the range of 40 to 80 using the ASTM D-1238 standard.

In FIGS. 1 and 4, the DLO section of the glazing 10 includes a switchable film such as, for example, suspended particle device ("SPD") film 18 although in other embodiments, other switchable films such as a polymer dispersed liquid crystal ("PDLC") film also could be used. As shown in FIGS. 1 and 4, switchable film 18 has first and second oppositely disposed major faces with and edge surface defined between the faces. The first major face of switchable film 18 faces the second major face of first interlayer 16.

As shown more particularly in FIG. 4, SPD switchable film 18 has an SPD emulsion 19 that is confined between two sheets 19a and 19b of flexible material. In the example of the preferred embodiment, the sheets are made of PET. Each of sheets 19a and 19b is provided with respective, electrically conductive coatings 19c and 19d. Electrically conductive coatings 19c and 19d are located between the emulsion 19 and the respective sheet 19a or 19b. A silver paste or other electrically conductive material electrically connects coatings 19c and 19d to respective buss bars that are also electrically conductive. FIG. 6 shows a buss bar 19e that is electrically connected to coating 19d by silver paste 19f. Similarly, another buss bar is electrically connected to coating 19c by silver paste in a structure that is the inverse of that shown in the cross-section of FIG. 4. Transmittance of light between sheets 19a and 19b through SPD emulsion 19 is controlled by controlling the voltage applied to coatings 19c and 19d through their respective buss bars. Such SPD switchable film is commercially available from Hitachi Chemical Company.

Alternatively, a PDLC-type switchable film is commercially available from iGlass. Switchable film 18 is layered in glazing 10 such that IR-reflective coating 14 is located in the glazing 10 between a light source (e.g., the sun) and the switchable film 18. In this way, IR reflective coating 14 protects switchable film 18 from IR light from the sun.

Glazing 10 further includes a second interlayer 20, which may be constructed of the same or a different suitable material as the first interlayer 16, such as the materials recited hereinabove in connection with the first interlayer 16. Second interlayer 20 has first and second oppositely disposed major faces with an edge surface defined between the major faces. The first major face of second interlayer 20 faces the second major face of switchable film 18.

Glazing 10 further includes a second layer of glass 22. Glass layer 22 is the inside layer of glass for glazing 10. The second layer of glass 22 may be any type of glass suitable for automotive application such as, for example, PPG Solarphire® glass or PPG Solex® glass. Second glass layer 22 has first and second major faces that are oppositely disposed from each other and that define an edge surface therebetween. The first major face of second glass layer 22 faces the second major face of second interlayer 20.

Glazing 10 may further include a dark, or black, paint layer or band 24 that is located adjacent to the perimeter of glazing 10. Paint band 24 is for aesthetic purposes to hide the edge structure of glazing 10, electrical conductors for switchable film 18 and the like. Paint band 24 can be adhered to the IR coating 14a as shown in FIG. 1. Alternatively, paint band 24 can be adhered directly to surface of glass layer 12b that is facing interlayer 16a. In that case, IR coating 14a is sputtered or otherwise applied to the paint band and the IR coating is in contact with the major surface of interlayer 16a. In addition, paint band 24 can be adhered to the surface of glass 22a that faces away from interlayer 20a as is also shown in FIG. 1. In still another embodiment, paint band 24 can be adhered to the surface of glass 22 that faces interlayer 20a. In still another embodiment, paint band 24 can also be adhered to the surface of glass 12a that faces away from interlayer 16a. Finally, paint band 24 can be applied in any combination of the surfaces of glass 12a, glass 22a and IR reflective coating 14a as described above such that it is located on one or more of glass layers 12a and 22a and IR reflective coating 14a.

As also shown in FIGS. 1 and 4, a partial layer of an interlayer/spacer 25 material such as PVB is located in the region outside the perimeter of switchable film 18. Spacer 25 maintains the approximate overall thickness of glazing 10 in the area beyond the perimeter of switchable film 18 that glazing 10 has in the area of the area of the DLO and switchable film 18. In this way, glass layers 12 and 22 are not bent excessively during the autoclaving process so as to cause optical distortion in the area of the laminated glazing near the perimeter of switchable film 18.

Preferably, glazing 10 also includes an edge material 26 that is secured on the perimeter edge of SPD film 18. The edge material 26 may be, for example, a polyimide film such as, for example, Dupont Kapton® polyimide film. Edge material 26 isolates switchable film 18 from the interlayers 16, 20 and from spacer/interlayer 25 so that compounds from those components do not penetrate and degrade switchable film 18.

It has been found that if edge material 26 is too thick it sometimes blocks the migration of air during the prepress process for removing air from the stack prior to the autoclave step. In that case, the volume of trapped air is not dissolved into the interlayer during standard temperatures and duration of the autoclave cycle. The excess air caused air bubbles to form in the glazing at or near the edges of the edge material.

Higher temperatures and hold times of the autoclave cycle were found to eliminate the air bubbles by causing the air to be dissolved into the interlayer. Typical time and temperatures are found to be approximately 120 minutes and 100° C.

Any number of glass layers 12, 22 and interlayers 16, 20 may be used depending on the particular application of glazing 10. Also, although glazing 10 is illustrated in FIGS. 1 and 4 as having a black paint layer 24 around its perimeter section, depending on the particular application of the glazing 10, the black paint layer 24 may be omitted.

In various example embodiments, the first layer of glass 12 and the second layer of glass 22 may be, for example, 1.8 to 2.1 millimeters thick, the interlayers 16, 20 may be, for example, 0.38 to 0.80 millimeters thick, and the switchable film 18 may be, for example, 0.34 millimeters thick. In various embodiments of the present invention, glazing 10 blocks more than 99% of UV light at a wavelength of 400 nanometers or less.

The glazing of the presently disclosed invention provides a switchable glazing for automotive applications that remains serviceable over time. Coating 14 increases the reflectance of infrared and visible light of the glazing 10 and thus limits the temperature of the switchable film 18 when glazing 10 is exposed to sunlight. Coating 14 also has UV reflectance and thus reduces the degradation of the switchable film 18 due to UV light exposure. Interlayer 16 absorbs UV light and thus also reduces the degradation of switchable film 18 due to UV light exposure. Since the emulsion of the switchable film 18 may be incompatible with interlayers 16, 20, edge material 26 seals the edges of film 18 to further limit degradation of switchable film 18.

Figure 2:
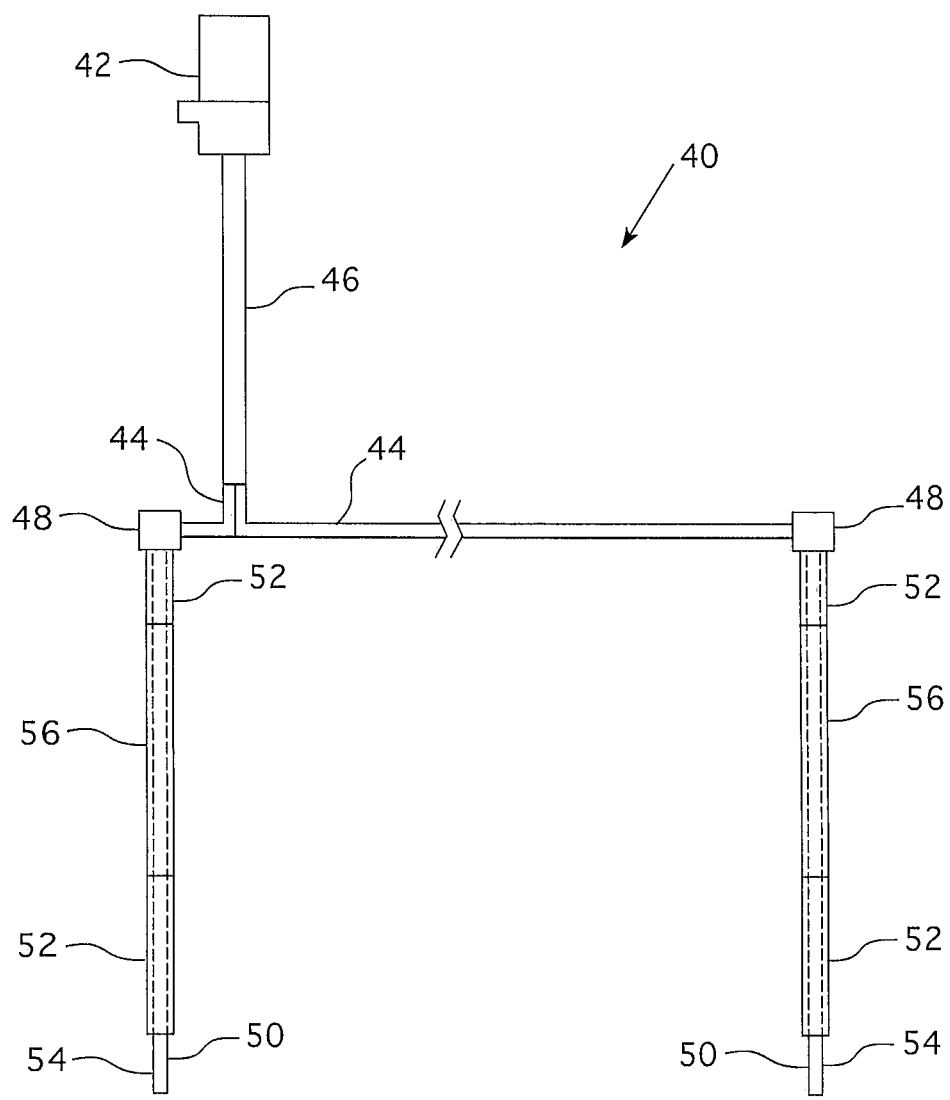
FIG. 2 illustrates an electrical connector according to various embodiments of the present invention.
Figure 3:
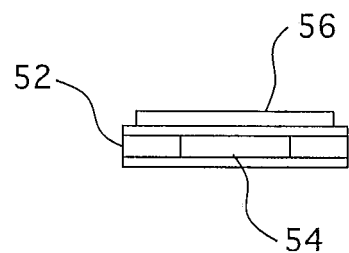
FIG. 3 illustrates a cross sectional view of the electrical connector of FIG. 2 according to various embodiments of the present invention.

FIG. 2 illustrates an electrical connector 40 according to various embodiments of the present invention. FIG. 3 illustrates a cross sectional view of the electrical connector 40 of FIG. 2 along line B-B according to various embodiments of the present invention. Connector 40 is configured to provide electrical voltage to the buss bars of switchable film 18. Connector 40 includes a housing 42 that is adapted to connect to an electrical system (not shown) that controls the voltage supply for switchable film 18 to actuate changes of state in switchable film 18. Wires 44 having a nonconductive sleeve 46 extend from housing 42 to molded areas 48. Conductive foil 50 extends from the molded areas 48, where each conductive foil 50 is electrically connected to one of the wires 44. Foil 50 is encapsulated in insulating layers 52 except at electrical termination points 54, where it contacts the buss bars of switchable film 18 so as to make electrical connection. Insulating layers 52 may be constructed of, for example, a polyimide film such as, for example, Dupont Kapton® polyimide film. An adhesive layer 56 attaches connector 40 to glazing 10.

Connector 40 is installed in glazing 10 such that one of the termination points 54 contacts a buss bar on one side of the switchable film 18 (i.e., a side of the switchable film 18 facing the second layer of glass 22) and the other termination point 54 contacts the buss bar on the other side of the switchable film 18 (i.e., a side of the switchable film 18 facing the first layer of glass 12). A voltage source (not shown), such as an AC voltage source, is connected to the wires 44. Change of state in switchable film 18 is accomplished by controlling the application of electrical voltage from the AC power source to the buss bars on switchable film 18.

In various embodiments, the AC power source level is adjustable in, for example, the range of 0 Volts to 140 Volts in the frequency range of 60 Hz to 500 Hz. In such embodiments, the applied signal level is directly related to the light transmittance (i.e. the percentage of visible light transmission) with 0 V being the "off", or darkest state, and 140 V being the most transparent state of the switchable film 18. In various embodiments, termination points 54 are physically spaced apart to avoid a short circuit and possible electromagnetic compatibility (EMC) issues.

Embodiments of the present invention provide laminated glazings that retain their capacity for variable light transmittance, glare reduction, and a level of privacy, and that are aesthetically pleasing. A nonlimiting example of an application of glazing 10 of embodiments of the present invention is for use in a vehicle sunroof. An advantage of using the glazing 10 in automotive applications is that the sunroof does not have to be covered by a closed shade to block glare and heat. Rather, it can be switched between transparent and translucent states and, in some embodiments, varying light transmittance states.

In various embodiments, the present invention is directed to a process for forming glazing 10. The first layer of glass 12 and the second layer of glass 22 are cut, ground, washed, painted with the black paint layer 24 (as necessary), coated with coating 14, and bent to shape. The edge cover is applied to the edges of the SPD film. The first layer of glass 12 and the second layer of glass 22 are then assembled with interlayers 16, 20, switchable film 18, spacer/interlayer 25 and connector 40. The assembly is laminated by pressing and heating the assembly in an autoclave to form glazing 10.

FIGS. 4 and 5 illustrate spectral properties of an exemplary embodiment of glazing 10 constructed according to the present invention wherein the switchable film was SPD switchable film of the type available from Hitachi Chemical Company. "T" represents the percentage of light transmittance of the glazing; $R_1$ is the % of light reflective off the free surface of glass panel 12 when exposed to a designated light source, $R_2$ represents the percentage of light reflectance off the free surface of glass panel 22 when exposed to a designated light source.

The spectral properties of glazing 10 when switchable film 18 is in the "power-off" state and glazing 10 is illuminated with an Ill. A-2 light source are 0.40% transmittance of visible light through glazing 10; reflectance of visible light off the free surface of glass panel 12 is 24.74%; and reflectance of visible light off the free surface of glass panel 22 is 6.52%. Similarly, transmittance for the UV spectrum as defined by ISO 9050 (280-380T) is 0.01% and transmittance for the IR spectrum as defined by ASTM 891 (800-2500T) is 0.22%; total solar transmittance as defined by SAE T(R) sol (E 892: 300-2500) is 0.46%. $R_1$ for solar UV is 27.75% and $R_1$ for solar IR is 92.35%. $R_1$ for total solar is 59.57%.

The spectral properties of glazing 10 when switchable film 18 is in the "power-on" state and glazing 10 is illuminated with an Ill. A-2 light source are, transmittance of the glazing for the visible spectrum is 39.10% and reflectance ($R_1$) is 25.39%. For the UV spectrum, transmittance as measured by the ISO 9050 (280-380T) standard is 0.01% and $R_1$ is 27.75%. For the IR spectrum of solar light, transmittance as measured by the ASTM 891 (800-2500T) standard is 0.79% and $R_1$ is 92.28%. For total solar as measured by the SAE T(R) sol (E892: 300-2500) standard, transmittance is 16.05% and $R_1$ is 59.78%.

The forgoing test results mean that glazing 10, while in the "off" state, transmits very little (0.40%) visible light. At the same time, a high degree of IR light (92.35%) and UV light (27.75%) is reflected so that the temperature of glazing 10 does not rise to levels that would damage the emulsion of the SPD film. In the "on" state, glazing 10 transmits a higher degree of visible light (39.10%), but still reflects much of the solar UV light (27.75%) as measured by the ISO 9050 (280-

380T) standard and also still reflects most solar IR light (92.28%) as measured by the ASTM 891 (800-2500T) standard. This means that even while glazing 10 is in the "on" state and visible light passes through it so that images on the opposite side of glazing 10 are clearly visible, the SPD film is still protected from degradation caused by exposure to UV light and/or temperatures above 90° C. Protection from exposure to UV light and high temperature (>90° C.) caused by IR light prolong the useful light of the SPD film and enhance the serviceability of glazing 10 in automotive applications.

While several embodiments of the invention have been described, various modifications, alterations and adaptations to those embodiments will be apparent to persons skilled in the art with the attainment of some or all of the advantages of the present invention. The presently disclosed invention therefore includes all such modifications, alterations and adaptations without departing from the scope and spirit of the present invention.

We claim:

1. A laminated glazing that selectively controls the transmittance of light through the glass in response to control signals, said glazing made from an assembly comprising:
    at least one layer of clear glass having first and second oppositely disposed major faces;
    an IR-reflective layer that reflects light in the infrared spectrum;
    a first interlayer that absorbs light in the ultraviolet spectrum and in the visible light spectrum and that is thermally compatible with autoclaving a switchable glazing, said interlayer having first and second oppositely disposed major faces;
    a switchable film having first and second major faces that are oppositely disposed from each other, the transmittance of visible light between said first and second major faces of said switchable film being variable in response to control signals applied to said switchable film, the first major face of said switchable film facing the second major face of said interlayer, said IR-reflective layer being between said second oppositely disposed major face of said layer of clear glass and said switchable film, and said first interlayer also being between said second oppositely disposed major face of said layer of clear glass and said switchable film, said first interlayer having radiation absorption properties in the frequency range of UV/visible radiation so as to be protective of said switchable film;
    a second interlayer having first and second oppositely disposed major faces with the first major face of said second interlayer facing the second major face of said switchable film; and
    a second glass layer having first and second oppositely disposed major faces with the first major face of said second glass layer facing the second major face of said second interlayer.

2. The laminated glazing of claim 1 wherein said IR-reflective coating comprises a double-layer silver coating.

3. The laminated glazing of claim 1 wherein said IR-reflective coating comprises a triple-layer silver coating.

4. The laminated glazing of claim 1 wherein said IR-reflective coating comprises a triple-layer silver coating with enhanced UV reflection.

5. The laminated glazing of claim 1 wherein said first interlayer comprises a layer of thermoplastic material.

6. The laminated glazing of claim 1 wherein said first interlayer comprises a layer of thermoplastic material with enhanced ultraviolet light absorption.

7. The laminated glazing of claim 1 wherein said first interlayer has a melt index in the range of 10 to 130.

8. The laminated glazing of claim 1 wherein said first interlayer has a melt index in the range of 40 to 80.

9. The laminated glazing of claim 6 wherein said first interlayer has enhanced ultraviolet light absorption for the light spectrum with wavelength below 400 nanometers.

10. The laminated glazing of claim 6 wherein said first interlayer has enhanced ultraviolet light absorption for the light spectrum with wavelengths below 410 nanometers.

11. The laminated glazing of claim 1 wherein said first interlayer is comprised of a material selected from one of the group comprising: thermoplastic polyurethane, ethylene vinyl acetate, and polyvinyl butyral.

12. The laminated glazing of claim 1 further comprising electrical conductors that are connected to said switchable film for supplying electrical power to said switchable film.

13. The laminated glazing of claim 1 further comprising an opaque coating that is adhered to at least one of the group comprising: said IR-reflective coating; said first major face of said first layer of glass, said second major face of said first layer of glass, said first major face of said second layer of glass, and the second major face of said second layer of glass.

14. The laminated glazing of claim 1 wherein said switchable film comprises an SPD film.

15. The laminated glazing of claim 1 wherein said switchable film comprises a PDLC film.

16. The laminated glazing of claim 1 wherein said laminated glazing defines an outside edge, said laminated glazing further comprising a border layer that is located between the perimeter of said switchable film and the outside edge of said laminated glazing.

17. The laminated glazing of claim 1 wherein said switchable film has an edge surface that is disposed between the first and second major faces of said switchable film, said laminated glazing further comprising a polyimide barrier that is secured to the edge of said switchable film, said barrier having low permeability to said interlayers.

18. A window glazing for use in vehicular applications, said glazing comprising:
    a switchable film that controls the transmittance of visible light passing through the film in response to an electrical control signal;
    a first glass pane, said first glass pane having a reflective coating on one surface thereof, said first glass pane reflecting more than 90% of light in the infrared spectrum;
    a first interlayer that is disposed between said switchable film and said first glass pane, said first interlayer being thermally compatible with autoclaving a switchable glazing, and having radiation absorption properties in the frequency range of UV/visible radiation so as to be protective of said switchable film, said first interlayer binding said switchable film to said first glass pane and absorbing at least 98% of light having a wavelength below 380 nanometers;
    a second interlayer that is disposed on the side of said switchable film that is opposite from said first interlayer; and
    a second glass pane that is located on the side of said second interlayer that is opposite from said switchable film and that is bound to said switchable film by said second interlayer.

19. The window glazing of claim 18 wherein said first interlayer absorbs at least 98% of light having a wavelength below 400 nanometers.

20. The window glazing of claim 18 wherein said first interlayer absorbs at least 98% of light having a wavelength below 410 nanometers.

21. The window glazing of claim 18 wherein the reflective coating of said first glass pane also reflects light having a wavelength more than 400 nanometers.

22. The window glazing of claim 18 wherein the reflective coating of said first glass pane also reflects light having a wavelength more than 410 nanometers.

23. The window glazing of claim 22 wherein said switchable film transmits more than 38% of visible light at times when said electrical control signal is on and wherein said switchable film transmits less than 1% of visible light at times when said electrical control signal is off.

24. The window glazing of claim 18 wherein said first interlayer is comprised of a thermoplastic material having a melt index in the range of 40 to 60.

25. A laminated glazing that selectively controls the transmittance of light through the glass in response to electrical control signals, said glazing made from an assembly comprising:
   at least one layer of clear glass having first and second oppositely disposed major faces;
   an IR-reflective coating that reflects light in the infrared spectrum, said IR-reflective coating being applied to said second oppositely disposed major face of said layer of clear glass;
   a first interlayer that absorbs light in the ultraviolet spectrum and in the visible light spectrum and that is thermally compatible with autoclaving a switchable glazing, said first interlayer having first and second oppositely disposed major faces with said first major face of said first interlayer facing said IR-reflective coating;
   a switchable film having first and second major faces that are oppositely disposed from each other, the transmittance of visible light between said first and second major faces of said switchable film being variable in response to electrical control signals applied to said switchable film, the first major face of said switchable film facing the second major face of said interlayer, said first interlay having radiation absorption properties in the frequency range of UV/visible radiation so as to be protective of said switchable film;
   a second interlayer having first and second oppositely disposed major faces with the first major face of said second interlayer facing the second major face of said switchable film; and
   a second glass layer having first and second oppositely disposed major faces with the first major face of said second glass layer facing the second major face of said second interlayer.

* * * * *